Feb. 5, 1946.  E. C. WAHLBERG  2,394,029
ELECTRIC CONTROL CIRCUIT
Filed June 18, 1943  4 Sheets-Sheet 2

INVENTOR.
Eric C. Wahlberg
BY Thomas C. Bitts
ATTORNEY

Feb. 5, 1946.  E. C. WAHLBERG  2,394,029
ELECTRIC CONTROL CIRCUIT
Filed June 18, 1943   4 Sheets-Sheet 3
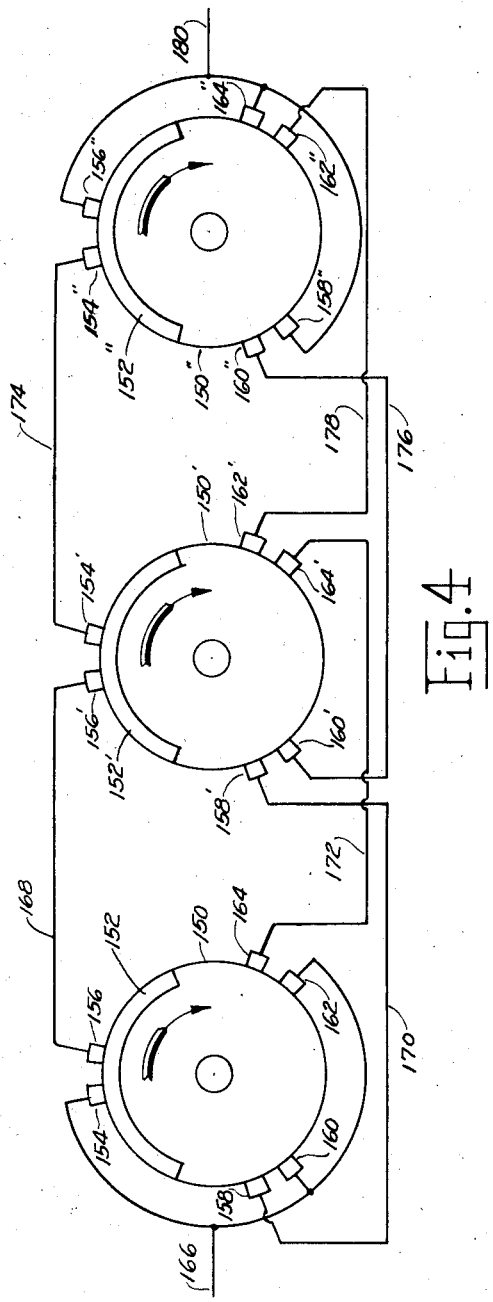
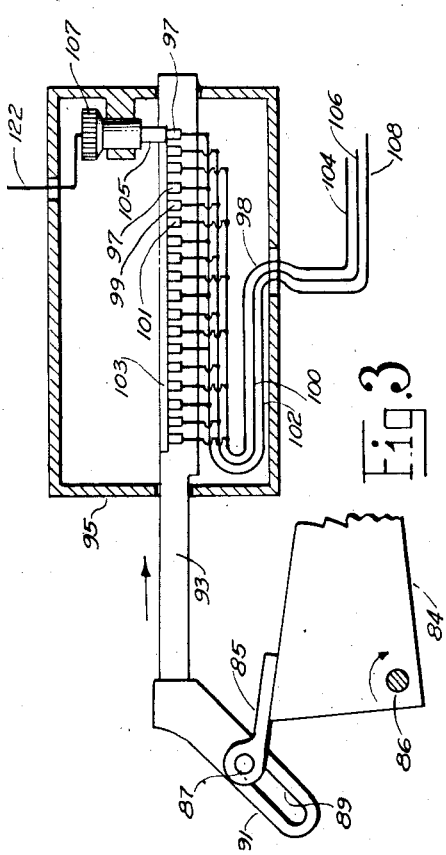
INVENTOR.
Eric C. Wahlberg
BY Thomas G. Bitts
ATTORNEY

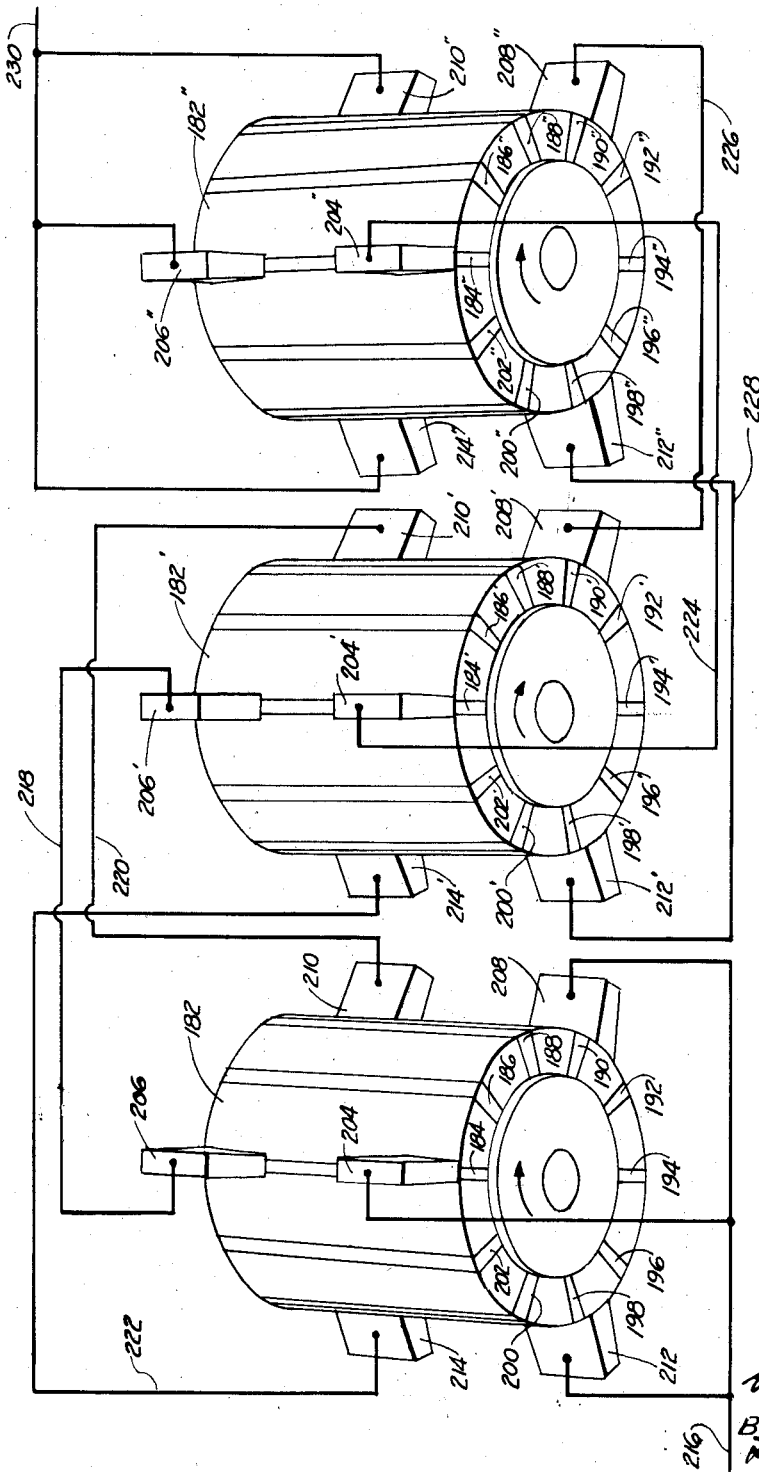

Patented Feb. 5, 1946

2,394,029

UNITED STATES PATENT OFFICE 2,394,029

ELECTRIC CONTROL CIRCUIT

Eric C. Wahlberg, Stamford, Conn., assignor to Electrolux Corporation, Old Greenwich, Conn., a corporation of Delaware Application June 18, 1943, Serial No. 491,282

11 Claims. (Cl. 172—293)

My invention relates broadly to means for interrupting an electric circuit whenever one of two or more moving members gets a predetermined amount out of synchronism with respect to the other moving members. The opening of the circuit may be employed for any desired purpose, such as to initiate corrective measures to reestablish synchronism, to operate a warning signal for informing the operator that one of the members is out of synchronism, or to stop the movement of the members.

More specifically, my invention contemplates means for preventing unequal opening or closing of the wing flaps of an airplane. Further objects and advantages of my invention will be apparent from the following descriptions considered in connection with the accompanying drawings which form a part of this specification and of which:

Fig. 3 is a more or less diagrammatic illustration of a modification of certain parts shown in Fig. 2;

Fig. 4 is a wiring diagram of my invention as applied to three rotating members; and Fig. 5 is a wiring diagram showing a modification of the arrangement illustrated in Fig. 4

Figure 1:
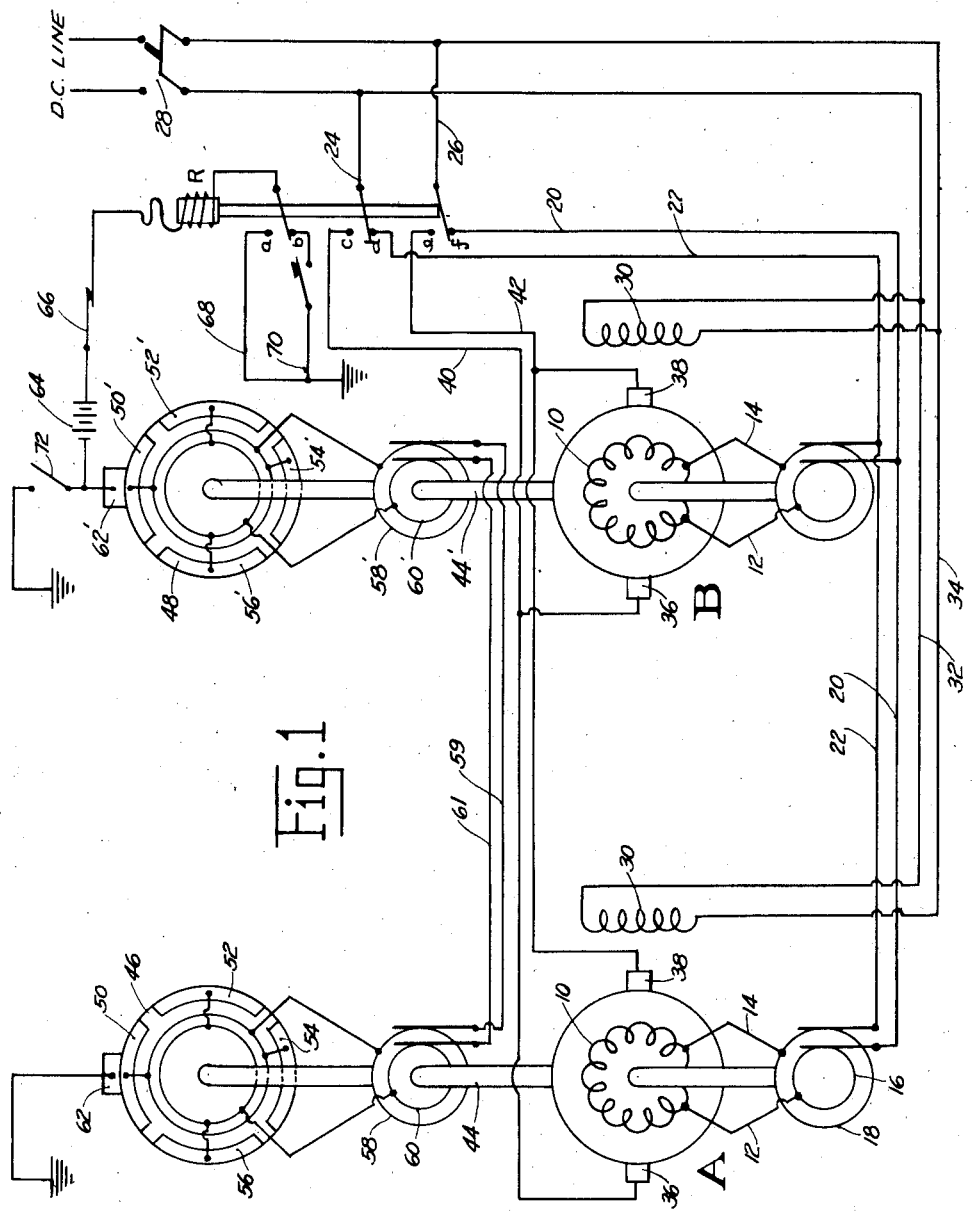
Fig. 1 is a wiring diagram showing an application of my invention for stopping the rotation of two motors in the event that they get out of synchronism.

Referring more particularly to Fig. 1, reference characters A and B designate two synchronously operating direct current motors of the type disclosed in my co-pending applications Serial No. 428,018 filed January 24, 1942 and Serial No. 472,464 filed January 15, 1943. As described in said applications, a plurality of direct current motors may be caused to operate in synchronism if similar points in the armature windings of the several motors are connected to each other through suitable slip rings. Also, the armatures of the several motors may be angularly positioned before starting by applying direct current across two similar points in the armature windings of the motors. After the motors have been positioned in this manner, the direct current supply to the aforesaid points in the armatures is interrupted and current is supplied through the commutators in the usual manner. Thereupon, the motors start and run in synchronism due to the connections between the similar points in the several armatures. The motors may be stopped in synchronism and their armatures angularly positioned with respect to each other by interrupting the current to the commutators and again applying direct current through the slip rings to the similar points in the armature. However, as far as the present invention is concerned, the motors A and B could be any type of synchronous motor.

As illustrated in Fig. 1, each of the motors is provided with a winding diagrammatically illustrated at 10, while leads 12 and 14 connect similar points on the armature windings with slip rings 16 and 18, respectively. These slip rings are connected together by means of conductors 20 and 22. These conductors are also connected to the normally closed contacts $d$ and $f$ of a relay R. The blades cooperating with contacts $d$ and $f$ are connected through conductors 24 and 26 with a suitable source of direct current which may be controlled by the double pole switch 28. The motors are provided with field windings 30 which are connected in parallel by means of the conductors 32 and 34 to the switch 28.

Commutator brushes 36 and 38 are provided for each motor and are connected in parallel through the conductors 40 and 42, respectively, with the normally open contacts $c$ and $e$ of the relay R.

Mounted on the shafts 44 of the motors A and B are contact carrying elements 46 and 48, respectively. As shown, each element is provided with four contacts in the form of segments 50, 52, 54 and 56 and 50', 52', 54' and 56'. The segments 50 and 54 of element 46 are connected together and are connected to a slip ring 58, while the segments 50' and 54' of element 48 are connected together and to a slip ring 58'. Segments 52 and 56 are connected together and to a slip ring 60, while segments 52' and 56' are connected together and to a slip ring 60'. Slip rings 58 and 58' are connected through a conductor 59, while slip rings 60 and 60' are connected by a conductor 61. A brush or other suitable contact making means 62 of a peripheral width sufficient to span the gap between segments cooperates with element 46 and is connected to ground. A similar brush 62' cooperates with the element 48 and is connected to one side of a suitable supply of electric current, such as the battery 64. The other side of the battery is connected through a manual switch 66 to the holding coil of the relay R. The other terminal of the holding coil is connected to the blade of the relay which cooperates with the contacts $a$ and $b$. The contact $a$ is connected through a conductor 68 to ground, while contact $b$ is connected to ground through a push button type switch 70.

Brush 62' may be connected directly to ground through a manual switch 72, but this switch is normally left open and is closed only in the event that it is desired to cut the elements 46 and 48 out of the circuit and connect the battery 64 directly to ground.

The above-described device operates as follows:

In starting, the switch 28 is closed, thus supplying excitation current directly to the field windings 30 of the motors A and B. Current is also supplied from the line through the conductors 24 and 26, the closed contacts d and f, the conductors 22 and 20, the slip rings 18 and 16 and the leads 14 and 12 to the armature windings 10. This causes the armatures of the two motors to be angularly positioned, if they were not already positioned, so as to bring similar segments of the contact carrying elements 46 and 48 into contact with the brushes 62 and 62'. As shown in the wiring diagram, segments 50 and 50' of the two elements are in contact with their respective brushes.

This serves to establish a circuit from ground through the brush 62, segment 50, slip ring 58, conductor 59, slip ring 58', segment 50' and brush 62' to one side of the battery 64. From the other terminal of the battery the circuit continues through the manual switch 66 and the holding coil of the relay R to the contact b. However, as long as push button switch 70 is open, the relay remains deenergized, but closing of the switch 70 completes the circuit to ground and the relay is energized. This causes the blade of the relay which is connected to the holding coil to close the contact a, thus establishing a holding circuit through the conductor 68, whereupon the push button switch 70 may be opened without deenergizing the relay.

Actuation of the relay opens the contacts d and f and closes the contacts c and e. Consequently, the supply of direct current to the slip rings 16 and 18 is interrupted, while current is supplied to the armatures through the commutator brushes 36 and 38.

The motors now start in the usual manner and tend to run in synchronism due to the permanent connection provided by the conductors 20 and 22 between the slip rings 16 and 18. Synchronous operation of the motors causes the elements 46 and 48 to rotate in synchronism. As soon as the elements have turned through approximately one-eight of a revolution from the position shown in Fig. 1, the segments 56 and 56' or 52 and 52', depending upon the direction of rotation, come into contact with the brushes 62 and 62'. There is thus established a circuit from ground through the brush 62, the slip ring 60, the conductor 61, the slip ring 60' and the brush 62' to the battery. Inasmuch as the brushes 62 and 62' are wide enough to span the gap between the segments, no interruption in the holding circuit of the relay occurs, and as long as the two motors and their respective elements 46 and 48 rotate in synchronism, the relay remains energized.

However, if as a result of a large inequality in loads or for any other reason, one of the motors speeds up or slows down with respect to the other an amount sufficient so that the brush 62 is in contact with either the segments 50 or 54, while the brush 62' is in contact with either the segments 52' or 56', the holding circuit of the relay will be interrupted, with the result that the relay is deenergized. This interrupts the supply of current to the brushes 36 and 38, thus causing the motors to stop. At the same time, direct current is supplied to the slip rings 16 and 18, thus angularly positioning the motors. This, of course, brings the elements 46 and 48 back into the proper angular relationship, but the motors do not start up unless the push button switch 70 is manually closed.

If for any reason it is desired to operate the motors A and B, even though they will not run in synchronism, the switch 72 may be closed, thus cutting the elements 46 and 48 out of the circuit. Thereupon, if the push button switch 70 is closed, the relay R will be energized and will remain energized regardless of whether or not the motors and the elements 44 and 46 are rotating in synchronism.

The switch 66 is provided for the purpose of stopping and positioning the motors while they are running in synchronism. Of course, the motors could be stopped by opening the switch 28, but if this were done, the excitation current for the fields would be interrupted and no current would be supplied to the slip rings 16 and 18. By opening switch 66 while switch 28 remains closed, the relay R is deenergized so as to supply current to the slip rings 16 and 18 while the fields remain excited, thus positioning the armatures of the motors.

Figure 2:
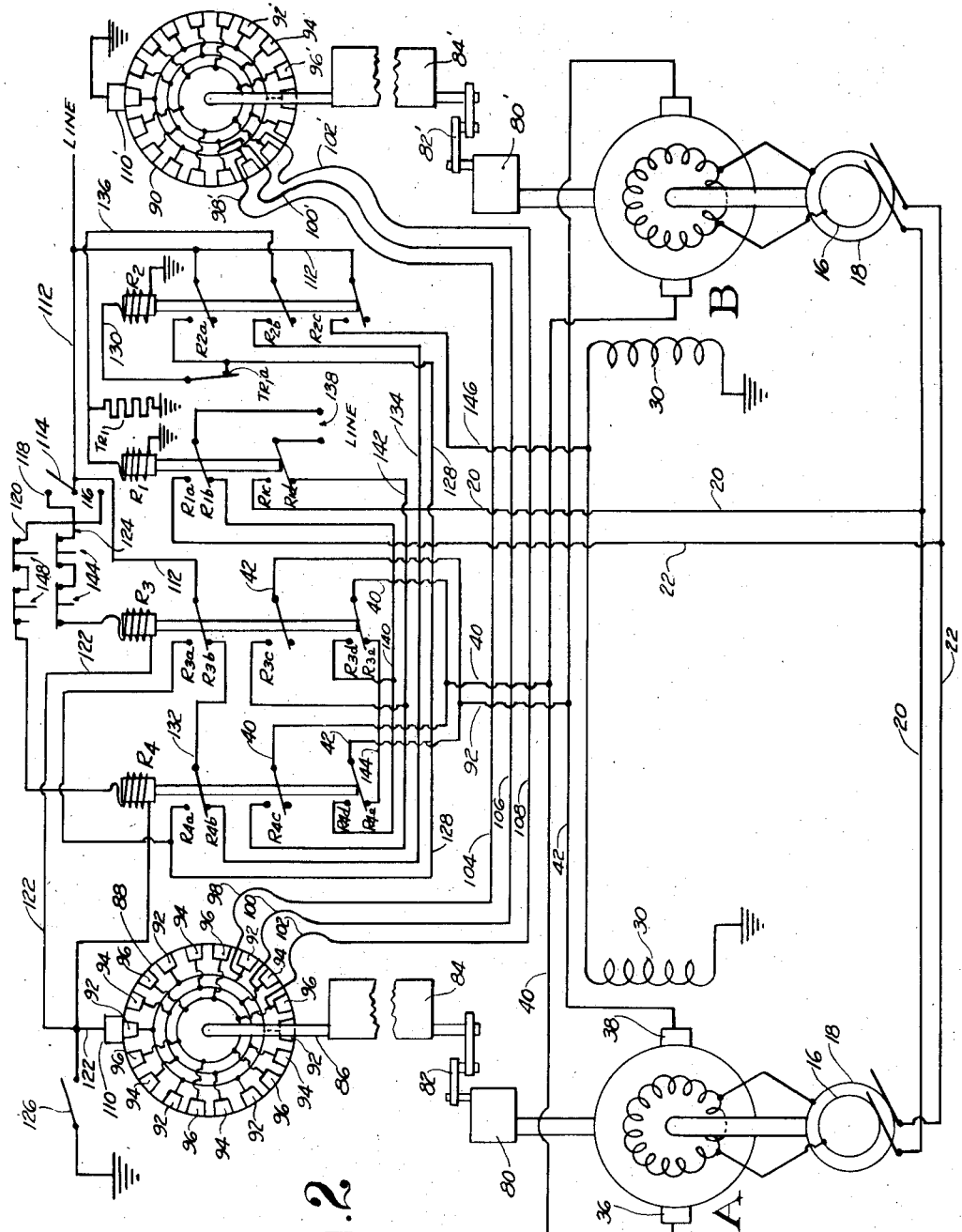
Fig. 2 is a wiring diagram showing the application of my invention to control the operation of the wing flaps of an airplane.

In Fig. 2 there is shown a wiring diagram suitable for controlling the flap motors for an airplane. Again the motors are designated by the reference characters A and B and are provided with slip rings 16 and 18 connected together by means of conductors 20 and 22, while the armature brushes 36 and 38 of the motors are connected in parallel by means of conductors 40 and 42.

Each motor is connected through a gear box 80 with suitable linkage 82 connected to pivot a wing flap 84 which is mounted on a shaft 86.

Fixed to the two shafts 86 are contact carrying elements 88 and 90, which correspond to the elements 46 and 48 shown in Fig. 1, except that they are provided with a relatively large number of contacts or segments and are similar in appearance to commutators. These segments are connected in three groups, every third segment being connected in the same group. Thus, segments 92 are all connected together to form one group, segments 94 are connected together to form another group and segments 96 are connected together to form the third group. Due to the fact that the wing flap turns through a maximum angle of about 55°, it is not necessary to provide slip rings, but flexible leads 98, 100 and 102 may be employed for connecting the respective groups of segments to conductors 104, 106 and 108 which in turn are connected to similar flexible leads 98', 100' and 102' for the element 90. The elements are provided with brushes 110 and 110', respectively, which are wide enough to span the gap between adjacent segments but are not wide enough to be in contact with three segments at any given instant.

The relay circuit comprising the relays $R_1$, $R_2$, $R_3$, $R_4$ and $TR_1$ is similar in most respects to that disclosed in Fig. 2 of my co-pending application Serial No. 484,531 filed April 26, 1943. It includes a current supply line 112 connected to the blade of a single pole double throw switch 114 having contacts 116 and 118. Contact 116 is connected by means of a conductor 120 with one terminal of the holding coil of relay $R_4$, the other terminal of which coil is connected by a conductor 122 with the brush 110 of contact carrying element 88. Contact 118 of the double throw switch is connected by means of a conductor 124 with the holding coil of the relay $R_3$, the other terminal of which coil is likewise connected to the brush 110 by means of the conductor 122. The brush 110' of contact carrying element 90 is grounded, and a manually operable switch 126 is provided for connecting the holding coils of relay $R_3$ and $R_4$ directly to ground if it is desired to cut the elements 88 and 90 out of the circuit.

The line 112 is connected directly to the blade of relay $R_3$ which cooperates with the contacts $R_{3a}$ and $R_{3b}$. Contact $R_{3a}$ is connected by means of a conductor 128 with the normally open contact $R_{4a}$ of relay $R_4$ and with the normally open contact $R_{2a}$ of a relay $R_2$. The conductor 128 is also connected to the normally closed contact $TR_{1a}$ of thermal relay $TR_1$. The blade of this relay is connected by a conductor 130 with one terminal of the holding coil of the relay $R_2$, the other terminal of which is grounded.

The normally closed contact $R_{3b}$ of relay $R_3$ is connected by a conductor 132 with the blade of relay $R_4$ which cooperates with contacts $R_{4a}$ and $R_{4b}$. A conductor 134 connects normally closed contact $R_{4b}$ with the normally open contact $R_{2b}$ of relay $R_2$. The blade of this relay which cooperates with contact $R_{2b}$ is connected through a conductor 136 with one terminal of the holding coil of relay $R_1$, the other terminal of which is grounded. Conductor 136 is also connected to one terminal of the heating coil of the thermal relay $TR_1$, the other terminal of which is grounded.

The blades of relay $R_1$ are connected to the opposite sides of a current supply line 138. The normally open contacts $R_{1a}$ and $R_{1c}$ are connected to the conductors 22 and 20 respectively, which lead to the slip rings 18 and 16 of the motors A and B. The normally closed contacts $R_{1b}$ and $R_{1d}$ are connected by conductors 140 and 142 to the normally open contacts $R_{3d}$ and $R_{3c}$, respectively, of relay $R_3$ and to the normally open contacts $R_{4d}$ and $R_{4c}$, respectively, of relay $R_4$. Conductor 40 is connected to the blade of relay $R_4$ which cooperates with contact $R_{4c}$ and with the blade of relay $R_3$ which cooperates with contacts $R_{3d}$ and $R_{3e}$, while conductor 42 is connected to the blade of relay $R_4$ which cooperates with contacts $R_{4d}$ and $R_{4e}$ and to the blade of relay $R_3$ which cooperates with contact $R_{3c}$. Contacts $R_{3e}$ and $R_{4e}$ are connected together by a conductor 144.

One side of each of the field windings 30 is grounded, while the other side is connected by means of a conductor 146 to the normally open contact $R_{2c}$ of relay $R_2$. The blade which cooperates with contact $R_{2c}$, as well as the blade which cooperates with contact $R_{2a}$ are connected directly to the line 112.

The above-described device operates as follows:

When the pilot desires to open the wing flaps 84 and 84', he throws the switch 114 to the lowermost position, thus supplying current from the line 112 through the contact 116, and conductor 120 to the holding coil of the relay $R_4$. From here the circuit is completed through the line 122, the brush 110, segment 92 of contact carrying element 88, flexible lead 98, conductor 104, flexible lead 98', segment 92' and brush 110' to ground. Relay $R_4$ is thus energized and contact $R_{4a}$ is closed. Current is consequently supplied from line 112 through normally closed contact $R_{3b}$, conductor 132, contact $R_{4a}$, conductor 128, contact $TR_{1a}$, and conductor 130 to the holding coil of relay $R_2$. Inasmuch as the other side of this coil is permanently grounded, the coil is energized so as to close contacts $R_{2a}$, $R_{2b}$, and $R_{2c}$. Closing of the last-mentioned contact supplies current from the line 112 through the conductor 146 to excite the field windings 30.

Relay $R_1$ remains deenergized for, although contact $R_{2b}$ is closed, contact $R_{4b}$ is opened and consequently, no current is supplied to the holding coil of relay $R_1$. Current therefore flows from the line 138 through the blades of this relay and through the normally closed contacts $R_{1b}$ and $R_{1d}$ and the conductors 140 and 142 to the closed contacts $R_{4d}$ and $R_{4c}$, respectively. From here the current flows through the conductors 42 and 40, respectively, to the brushes 36 and 38 of the motors A and B. The motors are thus caused to rotate in a direction such as to open the flaps 84 and 84' through the mechanical connection constituting the gear reduction units 80 and 80' and the linkage 82 and 82', respectively. If the mechanism is operating properly, the motors A and B run in synchronism and consequently the flaps 84 and 84' open together. This causes the elements 88 and 90 to rotate in synchronism with the result that, assuming the elements to rotate in a counterclockwise direction, the circuit between the brushes 110 and 110' is completed first through a segment 92, conductor 104 and segment 92', then through a segment 94, conductor 106 and segment 94', then through a segment 96, conductor 108 and segment 96', and through another segment 92, conductor 104 and another segment 92' and so forth. Due to the fact that the brushes 110 and 110' are broad enough to span the gap between adjacent segments, there is no interruption in the circuit as long as the elements rotate in synchronism. However, should one of the elements get out of angular phase relation with respect to the other so that the brush 110 is in contact with, for instance, a segment 94, at the same instant the brush 110 is in contact either with a segment 92' or 96' the circuit will be open, thus deenergizing relay $R_4$, which serves to stop the motors A and B in a manner to be subsequently described.

It is preferable to have three groups of contact segments, instead of the two groups shown in Fig. 1, in order to prevent the circuit from remaining closed in the event that one of the flaps does not open at all. It might be that the mechanical connection between one of the motors and its flap has been damaged to such an extent that the motor may run without actuating the flap. Moreover, the flap might be in such a position that the brush 110 or 110' spans two adjacent segments. In such an event, if there were only two groups of segments, the circuit through the contact carrying elements would not be interrupted even through one element did not rotate at all. However, by providing three groups of segments connected by means of the three conductors 104, 106 and 108, this condition cannot obtain and an open circuit will occur after one of the elements has rotated through an angle not greater than that occupied by three segments.

If the circuit through the elements 88 and 90 is interrupted and the relay $R_4$ thus deenergized, contact $R_{4a}$ is opened and contact $R_{4b}$ is closed. Consequently, current from the line 112 passes through contact $R_{3b}$, conductor 132, contact $R_{4b}$, conductor 134, contact $R_{2b}$, and conductor 136 to energize relay $R_1$ and to heat the coil of thermal relay $TR_1$. Relay $R_2$ remains energized due to the holding circuit provided from the line 112 through the contact $R_{2a}$, contact $TR_{1a}$, and conductor 130, even though the contact R4a is now open.

Energization of relay R1 opens the contacts R1b and R1d, thus interrupting the flow of current from the line 138 to the conductors 140 and 142 and consequently the brushes 36 and 38 of the motors A and B are disconnected from the line.

Closing of the contact R4e serves to short circuit the armature leads 40 and 42 of the motors A and B, thus dynamically braking the motors and bringing them to a quick stop. At the same time, contacts R1a and R1c are closed and current from the line 138 is supplied through these contacts to the conductors 22 and 20 and the slip rings 18 and 16. The fields 30 remain excited, inasmuch as contact R2c remains closed, and consequently, the motors A and B are angularly positioned.

After a predetermined length of time the heating of the coil of thermal relay TR1 causes the contact TR1a to open, thus opening the holding circuit of relay R2 and deenergizing this relay. This opens contact R2c, which interrupts the supply of current to the field windings 30. Contact R2b is also opened, thus interrupting the supply of current through the conductor 136 to relay R1 and to thermal relay TR1. Consequently, both of these relays are deenergized. Contacts R1a and R1c are thereupon opened and the supply of current from the line 138 to the slip rings 16 and 18 is interrupted. At the same time, contacts R1b and R1d are closed but this does not result in connecting the brushes 36 and 38 to the line because contacts R4c and R4d and R3c and R3d remain open.

If the flaps 84 and 84' open in synchronism, the elements 88 and 90 do not interrupt the holding circuit of relay R4 and the flaps continue to open until they have reached the desired angle of, for instance, 55° if they are landing flaps, or 25° if they are diving flaps. When the desired angle has been reached, so-called limit switches 148, which are connected in series in the conductor 120, are opened, thus deenergizing relay R4. Thereupon, the same sequence of operations takes place as previously described when the relay was deenergized because of the elements 88 and 90 getting out of synchronism.

When it is desired to close the wing flaps, the pilot throws the switch 114 to its uppermost position, thus supplying current to the holding coil of relay R3 through the contact 119 and conductor 124. The holding circuit for this relay is completed through conductor 122, and the elements 88 and 90 in the same manner as previously described, so long as the elements turn in synchronism. Actuation of relay R3 closes contacts R3a, R3c and R3d and current is supplied from the line 112 through contact R3a, conductor 128, contact TR1a and conductor 130 to energize relay R2. The operation of the control circuit is the same as that previously described except that conductors 140 and 142, carrying current from the line 138, are connected through closed contacts R3d and R3c, respectively, to conductors 40 and 42. Consequently, the polarity of conductors 42 and 40 is reversed with respect to their polarity when the relay R4 was energized, and, inasmuch as the polarity of the field coils 30 has not been reversed, the motors A and B run in the opposite direction so as to close the flaps. If the flaps close together, the holding circuit through the elements 88 and 90 is not interrupted and the motors continue to operate until the flaps are fully closed, whereupon limit switches 149 open the circuit. However, if the flaps for any reason do not close in synchronism, the circuit through the elements is interrupted, and both flaps remain open at substantially the same angle.

It will thus be seen, that with the arrangement illustrated in Fig. 2, it is impossible to open or close one flap unless the other flap is opened or closed a like amount. This is of great importance because, if one flap should open while the other remains closed, it would tend to throw the ship into a spin from which it would be difficult to recover, particularly at the low altitude at which the landing flaps are usually opened. It would be much better to have neither of the flaps open, which would merely mean that the ship would have to land at a higher speed than ordinarily.

If desired, the switch 126 may be provided for cutting the contact carrying elements 88 and 90 out of the circuit, which might be desirable if merely the elements themselves or the conductors 104, 106 and 108 connecting them were damaged. If, with the switch 126 open as it normally would be, the pilot throws the switch 114 to open the landing flaps and the flaps do not open, he could go up to a safe altitude and then close the switch 126. If the damage is in one of the motors, the gear unit or the linkage connected to the flap, this will result in one of the flaps starting to open, while the other would remain closed. The pilot would immediately be aware of this because of the reaction of the ship and would be ready to instantly cope with it by throwing switch 114 to the opposite position to close the flap which had started to open. Due to his altitude, he would have ample opportunity to regain control of the ship after the flap closed. However, if the damage was only in the contact carrying elements or in the conductors 104, 106 and 108, both flaps would open together and the ship could be landed with them open.

Instead of mounting a rotary contact carrying element on the shaft 86 of the wing flap, as illustrated in Fig. 2, the flap may be arranged so that pivoting thereof causes straight line motion of an element provided with a plurality of contacts or segments, as shown in Fig. 3. Thus, the flap 84 which is pivoted on the shaft 86 has attached thereto a member 85 which carries a pin 87 slidable within a curved slot 89 formed in an arm 91. Arm 91 is fixed to an element 93 which is slidably mounted in a suitable housing 95. A plurality of equally spaced segments 97, 99 and 101 are suitably mounted in the element with their upper surfaces flush with the bottom of a groove 103. The element 93, or at least that portion which carries the segments is preferably made of insulating material. The groove 103 is provided so that the segments cannot contact the casing 95, which may be of metal, when the element slides through a suitable opening in the casing.

As was the case in the embodiment illustrated in Fig. 2, every third segment is connected together, whereby there are three groups of segments. Flexible leads 98, 100 and 102 connect the three groups to the conductors 104, 106 and 108, respectively. A brush 105, carried by a suitable brush holder 107, enters the groove 103 so as to contact the segments as the element 93 is moved, and is connected to the conductor 122.

Devices like that shown in Fig. 3 could replace the rotary elements 88 and 90 of Fig. 2. As the wing flap pivots about the shaft 86 in a clockwise direction, it causes the element 93 to move to the right, thus causing the segments to slide under the brush 105. In the position shown the brush is in contact with one of the segments 97 and consequently the circuit is completed from the conductor 122 through the brush 105, the segment 97, the flexible lead 102 and the conductor 108, which leads to a similar device connected to the other wing flap. A slight movement of the element 93 to the right establishes a circuit through a segment 99, the flexible lead 100 and the conductor 106, while further movement establishes a circuit through a segment 101, flexible lead 98 and conductor 104.

Consequently, as long as the two wing flaps move in unison, the circuit remains closed, in the same manner as described in connection with Fig. 2. However, should one flap get out of angular phase relationship with respect to the other by an amount sufficient to cause the brushes in the different devices to contact segments of different groups, an open circuit results and the relays of Fig. 2 operate in the manner previously described to stop both motors.

In Fig. 4, there is illustrated an arrangement whereby any number of contact carrying elements may be connected together in such a way that asynchronous rotation of any one of them will open a circuit. The elements are designated by reference characters 150, 150' and 150". Each is provided with a single segment 152, 152' and 152" extending through an arc of a little more than 120°. Associated with each element are three pairs of brushes, those associated with element 150 being designated 154, 156 and 158, 160, and 162, 164. Brushes 154, 160 and 162 are connected to a conductor 166. Brush 156 is connected by means of a conductor 168 to a brush 156' associated with element 150'. Brush 158 is connected by means of a conductor 170 to a brush 158', while brush 164 is connected by means of a conductor 172 to a brush 164'. Brushes 154', 160' and 162' are connected by means of conductors 174, 176 and 178 to brushes 154", 160" and 162", respectively, associated with element 150". The remaining brushes 156", 158" and 164" are connected to a conductor 180.

With the elements in the position shown in Fig. 4, a circuit will be completed from conductor 166 through brush 154, segment 152, brush 156, conductor 168, brush 156', segment 152', brush 154', conductor 174, brush 154", segment 152", and brush 156" to conductor 180. No circuit will be completed through any of the other brushes inasmuch as none of them is in contact with a segment.

When the respective elements have rotated, for instance, in a clockwise direction as indicated by the arrows, through an arc sufficient to bring the segments 152, 152' and 152" into contact with the brushes 162 and 164, 162' and 164' and 162" and 164", the circuit between conductors 166 and 180 will be through these brushes and the conductors 172 and 178. Due to the fact that the segments subtend an arc of slightly more than 120°, this latter circuit will be established before the former is interrupted.

A rotation of another 120° brings the segments into contact with the brushes 158 and 160, 158' and 160', and 158" and 160" and consequently, a circuit is established through these brushes and the conductors 170 and 176.

However, should any one of the elements get out of synchronism with respect to the other to such an extent that, at any given instant, its segment contacts a pair of brushes which do not correspond to the pair contacted by the segments of the other elements, an open circuit results. Due to the fact that there are three pairs of brushes associated with each element, it is impossible for one element to remain in a stationary position contacting all the brushes. Due to the fact that there must be an overlap between successive pairs of brushes in order to avoid momentary opening of the circuit during synchronous operation, it would be possible for one or more elements to remain at rest in contact with all the brushes if only two pairs of brushes were employed.

It will be seen that with the arrangement illustrated in Fig. 4, the circuit between the conductors 166 and 180 will not be opened unless one of the contact carrying elements gets approximately 120° out of angular alignment with respect to the other elements. If it is desired to open the circuit when an element is out of angular alignment by a lesser amount, a plurality of relatively narrow contacts or segments may be employed, as illustrated in Fig. 5. Elements 182, 182' and 182" are provided respectively with segments 184 through 202, 184' through 202' and 184" through 202". Brushes 204, 206, 208, 210, 212 and 214 are associated with element 182 and are arranged in pairs, as shown in Fig. 5, the brushes of each pair being in axial alignment. Similar brushes 204', 206', 208', 210', 212', and 214' are associated with element 182' while brushes 204", 206", 208", 210", 212" and 214" are associated with element 182". A conductor 216 is connected to brushes 204, 208 and 212. Brushes 206 and 206', 210 and 210', and 214 and 214' are connected together by conductors 218, 220 and 222, respectively. Brushes 204' and 204", 208' and 208", and 212' and 212" are connected together by means of conductors 224, 226 and 228, respectively. A conductor 230 is connected to each of brushes 206", 210" and 214".

The segments in the elements are so spaced that one pair of brushes makes contact with a segment just before contact is broken between another pair of brushes and another segment. In Fig. 5, the brushes 204 and 206 are shown in contact with the segment 184 and consequently are connected through this segment. Assuming the commutator to be rotating in the direction indicated by the arrow, it will be seen that the segment 190 will make contact with the brushes 208 and 210 before segment 184 has passed out of contact with brushes 204 and 206. Likewise, segment 196 will come into contact with brushes 212 and 214 before segment 190 has passed out of contact with brushes 208 and 210. Consequently, as long as the several elements rotate together, a circuit will remain closed between the conductors 216 and 230.

However, should one of the elements get out of angular alignment with respect to the others by an amount equal to the width of a brush plus the width of a segment, the circuit will be opened at such element. Thus, if the element 182 is in the position shown in the figure, while the element 182' is ahead of the position shown by an amount sufficient to bring the segment 184' out of contact with the brushes 204' and 206', the circuit will be opened at the element 182'.

Obviously, in the arrangement shown in Figs. 4 and 5, as many contact carrying elements may be connected in series as is desired and the system will function to open the circuit when any one element gets out of proper angular relationship with respect to the others. The circuits shown in these figures may be employed to stop the motors in a manner similar to that shown in Figs. 1 and 2, or the circuits may be employed to operate warning devices or to initiate corrective measures or to perform any other desired function.

While I have shown several embodiments of my invention, it is to be understood that this has been done for purposes of illustration only and that the scope of my invention is not to be limited thereby, but is to be determined by the appended claims.

What I claim is:

1. In a device of the class described, a plurality of contact carrying elements movable in unison, contact making means associated with one of said elements, a plurality of conductors for connecting the contacts of said elements in series, the first-mentioned element successively connecting said conductors to said contact making means, and contact making means associated with the last element in the series, said last-mentioned element successively connecting said conductors to the last-mentioned contact making means in timed relationship to the connections established by the first-mentioned element so long as the elements move in unison.

2. In a device of the class described, a pair of rotatable members, means for rotating said members in synchronism, a contact carrying element rotatable with each of said members, each of said elements having a like number of contacts, a plurality of conductors for permanently connecting together corresponding contacts in the two elements, a brush associated with one of said elements, the one element successively connecting said conductors to said brush, and a brush associated with the other element, said other element successively connecting said conductor to the last-mentioned brush in timed relationship to the connections established by said one element as long as the elements rotate in synchronism.

3. In a device of the class described, a pair of rotatable members, means for rotating said members in synchronism, a contact carrying element rotatable with each of said members, each of said elements having a like number of contacts connected in a plurality of groups, adjacent contacts being connected to different groups, a conductor permanently connecting together corresponding groups in the two elements, a brush associated with one of said elements, the one element successively connecting said groups to said brush, and a brush associated with the other element, said other element successively connecting said groups to the last-mentioned brush in timed relationship to the connections established by said one element as long as the elements rotate in synchronism.

4. In a device of the class described, a pair of rotatable members, means for rotating said members in synchronism, a contact carrying element rotatable with each of said members, each of said elements having a like number of contacts connected in at least three groups, adjacent segments being connected to different groups, a conductor permanently connecting together corresponding groups in the two elements, a brush associated with each of said elements and having a width sufficient to span adjacent contacts and less than the minimum distance between alternate contacts, said elements successively and simultaneously connecting corresponding groups to the respective brushes as long as the elements rotate in synchronism.

5. In a device of the class described, a plurality of movable members, means for moving said members in unison, a contact carrying element movable in a straight line by each of said members, each of said elements having a like number of contacts, a plurality of conductors for connecting the contacts of said elements in series, contact making means associated with one of said elements, the one element successively connecting said conductor to said contact making means, and contact making means associated with the last element in the series, said last element successively connecting said conductors to the last-mentioned contact making means in timed relationship to the connections established by the said one element so long as the elements move in unison.

6. In a device of the class described, a plurality of synchronous electric motors, a contact carrying element movable by each motor, contact making means associated with one of said elements, a plurality of conductors for connecting the contacts of said elements in series, the first-mentioned element successively connecting said conductors to said contact making means, contact making means associated with the last element in the series, said last element successively connecting said conductors to the last-mentioned contact making means in timed relationship to the connections established by the first-mentioned element so long as the elements move in unison, and means operative by the opening of the circuit between said contact making means for stopping said motors.

7. In a device of the class described, a pair of synchronous electric motors, a contact carrying element rotatable by each of said motors, a plurality of conductors for permanently connecting together corresponding contacts in the two elements, a brush associated with each of said elements, said elements successively and simultaneously connecting corresponding contacts to the respective brushes to maintain a closed circuit between the brushes as long as the elements rotate in synchronism, and means operable by the opening of the circuit between said brushes for stopping said motors.

8. In a device of the class described, a plurality of contact carrying elements movable in unison, a plurality of pairs of brushes associated with each element, the brushes in each pair being arranged to be periodically connected together by the contacts of the respective elements, said connection in different pairs associated with the same element being established successively, means for connecting together one brush of each pair associated with one of said elements, means for connecting together one brush of each pair associated with another element, and means for interconnecting each of the otherwise unconnected brushes associated with each one of said elements with an otherwise unconnected brush of a corresponding pair associated with a single other element.

9. In a device of the class described, at least three contact carrying elements movable in unison, a plurality of pairs of brushes associated with each element, the brushes in each pair being arranged to be periodically connected together by the contacts of the respective elements, said connection in different pairs associated with the same element being established successively, means for connecting together one brush of each pair associated with the first of said elements, means for connecting together one brush of each pair associated with the last of said elements, and means for connecting each of the remaining brushes associated with said first element with a brush of a corresponding pair associated with an intermediate element, and means for connecting each of the remaining brushes associated with said last element with an otherwise unconnected brush of a corresponding pair associated with an intermediate element.

10. A device as set forth in claim 8 in which the contact carrying elements are rotatably mounted cylinders and both the pairs of brushes and the individual brushes in each pair are disposed circumferentially around the respective elements.

11. A device as set forth in claim 8 in which the contact carrying elements are rotatably mounted cylinders and the pairs of brushes are disposed circumferentially around the respective elements, the brushes in each pair being spaced axially.

ERIC C. WAHLBERG.